(12) United States Patent
Billman et al.

(10) Patent No.: US 10,272,494 B1
(45) Date of Patent: Apr. 30, 2019

(54) FABRICATING CONDUITS

(71) Applicant: United Services Automobile Association (USAA), San Antonio, TX (US)

(72) Inventors: Bradly Jay Billman, San Antonio, TX (US); Jordan Newmark, Fair Oaks Ranch, TX (US); Charles Lee Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 132 days.

(21) Appl. No.: 15/425,446

(22) Filed: Feb. 6, 2017

Related U.S. Application Data

(63) Continuation of application No. 14/254,167, filed on Apr. 16, 2014, now Pat. No. 9,562,632.

(60) Provisional application No. 61/890,100, filed on Oct. 11, 2013.

(51) Int. Cl.

| | | |
|---|---|---|
| *B29C 41/52* | (2006.01) | |
| *G01B 15/00* | (2006.01) | |
| *B22F 3/105* | (2006.01) | |
| *B33Y 10/00* | (2015.01) | |
| *B33Y 50/02* | (2015.01) | |
| *F16L 9/12* | (2006.01) | |
| *G06F 17/50* | (2006.01) | |
| *B29C 67/00* | (2017.01) | |
| *B33Y 80/00* | (2015.01) | |
| *B33Y 30/00* | (2015.01) | |
| *B22F 5/10* | (2006.01) | |
| *B23K 31/02* | (2006.01) | |
| *B23K 37/00* | (2006.01) | |
| *B29C 64/106* | (2017.01) | |
| *B29C 64/386* | (2017.01) | |
| *B29C 64/112* | (2017.01) | |
| *B29C 64/393* | (2017.01) | |

(Continued)

(52) U.S. Cl.
CPC ............ *B22F 3/1055* (2013.01); *B22F 5/106* (2013.01); *B23K 31/027* (2013.01); *B23K 37/00* (2013.01); *B29C 64/106* (2017.08); *B29C 64/112* (2017.08); *B29C 64/386* (2017.08); *B29C 64/393* (2017.08); *B29C 67/0088* (2013.01); *B33Y 10/00* (2014.12); *B33Y 30/00* (2014.12); *B33Y 50/02* (2014.12); *B33Y 80/00* (2014.12); *F16L 9/12* (2013.01); *G06F 17/5004* (2013.01); *B22F 2003/1057* (2013.01); *B22F 2998/10* (2013.01); *B23K 2101/06* (2018.08); *B29L 2023/22* (2013.01); *G06F 2217/34* (2013.01)

(58) Field of Classification Search
CPC ..... B29C 41/52; B29C 64/106; B29C 64/112; B29C 64/386; B29C 64/393
USPC .......................... 264/308, 409; 700/118, 119
See application file for complete search history.

(56) References Cited

U.S. PATENT DOCUMENTS

| | | |
|---|---|---|
| 5,601,763 A | 2/1997 | Hunter |
| 6,820,653 B1 | 11/2004 | Schempf et al. |
| 7,112,350 B1 | 9/2006 | Roberts |

(Continued)

*Primary Examiner* — Leo B Tentoni
(74) *Attorney, Agent, or Firm* — Fish & Richardson P.C.

(57) ABSTRACT

A method of fabricating a conduit includes providing a processor and receiving schematic information. The method also includes computing, using the processor, at least one three-dimensional configuration for the conduit and printing the conduit having the computed at least one three-dimensional configuration.

8 Claims, 6 Drawing Sheets

(51) Int. Cl.
*B29L 23/00* (2006.01)
*B23K 101/06* (2006.01)

(56) References Cited

U.S. PATENT DOCUMENTS

| | | |
|---|---|---|
| 9,562,632 B1 | 2/2017 | Billman et al. |
| 2003/0039752 A1 | 2/2003 | Winiewicz et al. |
| 2003/0225555 A1* | 12/2003 | Gurumoorthy ......... G06F 17/50 703/9 |
| 2004/0175239 A1 | 9/2004 | Pare |
| 2006/0118990 A1 | 6/2006 | Dierkes |
| 2006/0136182 A1 | 6/2006 | Vacanti |
| 2014/0084583 A1 | 3/2014 | Hemingway |
| 2015/0345688 A1 | 12/2015 | Kersey et al. |

* cited by examiner

FABRICATING CONDUITS

CROSS-REFERENCES TO RELATED APPLICATIONS

This application is a continuation of and claims priority to U.S. application Ser. No. 14/254,167, filed on Apr. 16, 2014, now U.S. Pat. No. 9,562,632, which claims priority to U.S. Provisional Patent Application No. 61/890,100, filed on Oct. 11, 2013, entitled "A Conduit and Method of Fabricating the Same," the disclosures of which are hereby incorporated by reference in its entirety for all purposes.

The following two regular U.S. patent applications (including this one) are being filed concurrently, and the entire disclosure of the other application is incorporated by reference into this application for all purposes:

application Ser. No. 14/254,167, filed Apr. 16, 2014, entitled "A Conduit and Method of Fabricating the Same", and application Ser. No. 14/254,174, filed Apr. 16, 2014, entitled "Plumbing Systems with Integrated Leak Detection and Repair".

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to construction environments. More specifically, the present invention relates to methods and systems for manufacturing 3D fluidic structures with controllable dimensions and features. In an embodiment, the methods and systems discussed herein can be used to fabricate 3D pipes for new home or building construction, remodeling, or the like.

According to an embodiment of the present invention, a method of fabricating a conduit is provided. The method includes providing a processor and receiving schematic information. The method also includes computing, using the processor, at least one three-dimensional configuration for the conduit and printing the conduit having the computed at least one three-dimensional configuration.

Embodiments of the present invention provide the capability to design and fabricate three-dimensional plumbing systems that can be fabricated on site. The ability to contour the internal and external dimensions of the fluid supply lines enables the separation of flow volume and pressure as design elements as well as integration of structural supports into the pipes. For example, embodiments of the present invention provide methods and systems that can be used to print 3D fluidic systems that are customized for a construction project.

According to an embodiment of the present invention, a method of fabricating a conduit is provided. The method includes providing a processor and receiving schematic information, for example, architectural plans for a structure or conduit diagrams. The method also includes computing, using the processor, at least one three-dimensional configuration for the conduit and printing the conduit having the computed at least one three-dimensional configuration. Embodiments of the present invention are applicable to both new construction and remodeling projects.

Computing the at least one three-dimensional configuration can use a predetermined pressure value based on fluid traveling through the conduit or can use a predetermined flow rate value at a predetermined location, for example, a fluid outlet. The method can further include receiving material stock, for example, recycled materials that are used in printing the conduit. The method can include receiving materials information. Receiving schematic information can include scanning a structure and computing, using the processor, the schematic information.

According to another embodiment of the present invention, a method of printing at least one three-dimensional system for conducting fluids is provided. The method includes receiving a set of specifications for the at least one three-dimensional system for conducting fluids. The set of specifications include fluid input pressure at a source and at least one of fluid outlet pressure or a flow rate. The set of specifications for the at least one three-dimensional system can include architectural plans for the at least one three-dimensional system. Each of the at least one of the fluid outlet pressure or flow rate are associated with a fluid outlet. The method also includes computing at least one three-dimensional configuration for the at least one three-dimensional system for conducting fluids. The at least one the fluid outlet pressure or the flow rate are provided at the fluid outlet. The method further includes fabricating the at least one three-dimensional system for conducting fluids using a three-dimensional printing process.

The method can also include receiving a set of specifications for a structure including the fluid outlet. Computing the at least one three-dimensional configuration can include providing a mechanical characteristic for the at least one three-dimensional system for conducting fluids. The at least one three-dimensional system for conducting fluids can be characterized by varying three-dimensional configuration thickness as a function of length. The at least one three-dimensional system for conducting fluids can be characterized by varying three-dimensional configuration (e.g., inner diameter) as a function of length. The at least one three-dimensional system for conducting fluids can include printed structural supports.

According to a specific embodiment of the present invention, a method of fabricating a conduit is provided. The method includes providing a processor and receiving schematic information for the conduit. The method also includes computing, using the processor, at least one three-dimensional configuration for the conduit and printing the conduit having the computed at least one three-dimensional configuration. The schematic information can include internal structure information or external structure information.

According to another specific embodiment of the present invention, a conduit formed from a three-dimensional printing process is provided. The conduit includes at least one layer of material forming a housing having an internal passage, a first housing surface, and a second housing surface. The first housing surface is representative of first configuration information. The first housing surface forms an external structural element. The second housing surface is opposite the first housing surface and is representative of second configuration information. The second housing surface forms an internal structural element to affect at least one of a fluid pressure or a fluid flow of a fluid, for example, a liquid or a gas such as air. The first configuration information or the second configuration information can be schematic information. The at least one layer of material can include a plurality of layers of differing materials disposed between the first housing surface and the second housing surface.

According to an embodiment of the present invention, a system is provided. The system includes a processor and a memory coupled to the processor. The system also includes a 3D printer, a building database, and a construction database. The system further includes an input/output module operable to communicate with user devices over a network. Using embodiments of the present invention, 3D conduits with differing materials and dimensions as described herein can be fabricated.

Numerous benefits are achieved by way of the present invention over conventional techniques. For example, embodiments of the present invention provide methods and systems that can be used to print 3D fluidic systems that are customized for a construction project. 3D pipes can be printed with predetermined shapes and using various materials to provide fluid control and structural support not available with conventional techniques. These and other embodiments of the invention along with many of its advantages and features are described in more detail in conjunction with the text below and attached figures.

DETAILED DESCRIPTION OF SPECIFIC EMBODIMENTS

Embodiments of the present invention provide methods and systems that can be used at a construction site, for example, either a new construction site or a building or structure undergoing remodeling, to print 3D fluidic systems such as pipes and ducts. As an example, the 3D pipes could be printed using PVC material, metals, alloys, other suitable materials, or combinations thereof. Utilizing fluid dynamics modeling software, the contours, internal shapes, external shapes, and pipe thickness can be varied as a function of length to increase the flow rate and/or pressure in some regions, decrease the flow rate and/or pressure in other regions, and the like. Thus, the principles of fluid dynamics can be utilized to the advantage of the user when printing the 3D pipes described herein.

As an example, if a particular fluid source, such as a shower, is desired to be a high pressure source, the geometry and structure of the pipes leading from the water source to the particular fluid source can be adjusted during the design and printing process to the desired flow capabilities. Thus, embodiments of the present invention are able to effectively utilize the geometry and structure of the 3D printed pipes to manage fluid characteristics in ways not available using conventional techniques. Structural adjustments provided by embodiments of the present invention include, but are not limited to, the external shape of the pipes, the internal shape of the pipes, the connections between pipes, the structural support provided by or to the pipes, and the like. In some embodiments, bends are designed into the pipes and then printed during manufacturing to provide custom-designed shapes rather than the conventional straight shapes typically utilized in construction projects.

In some embodiments, the ability to contour the internal dimensions of the fluid supply lines provides benefits not available using conventional methods and systems. As an example, embodiments of the present invention enable the separation of flow volume and pressure as design elements in a manner that is not available with conventional pipes. As examples, the flow volume at different locations in the building can be controlled as well as the fluid pressures at various outlets. Moreover, the ability to contour the internal dimensions of the pipe provide opportunities for efficient thermal transfer between fluids in the system.

Figure 1:
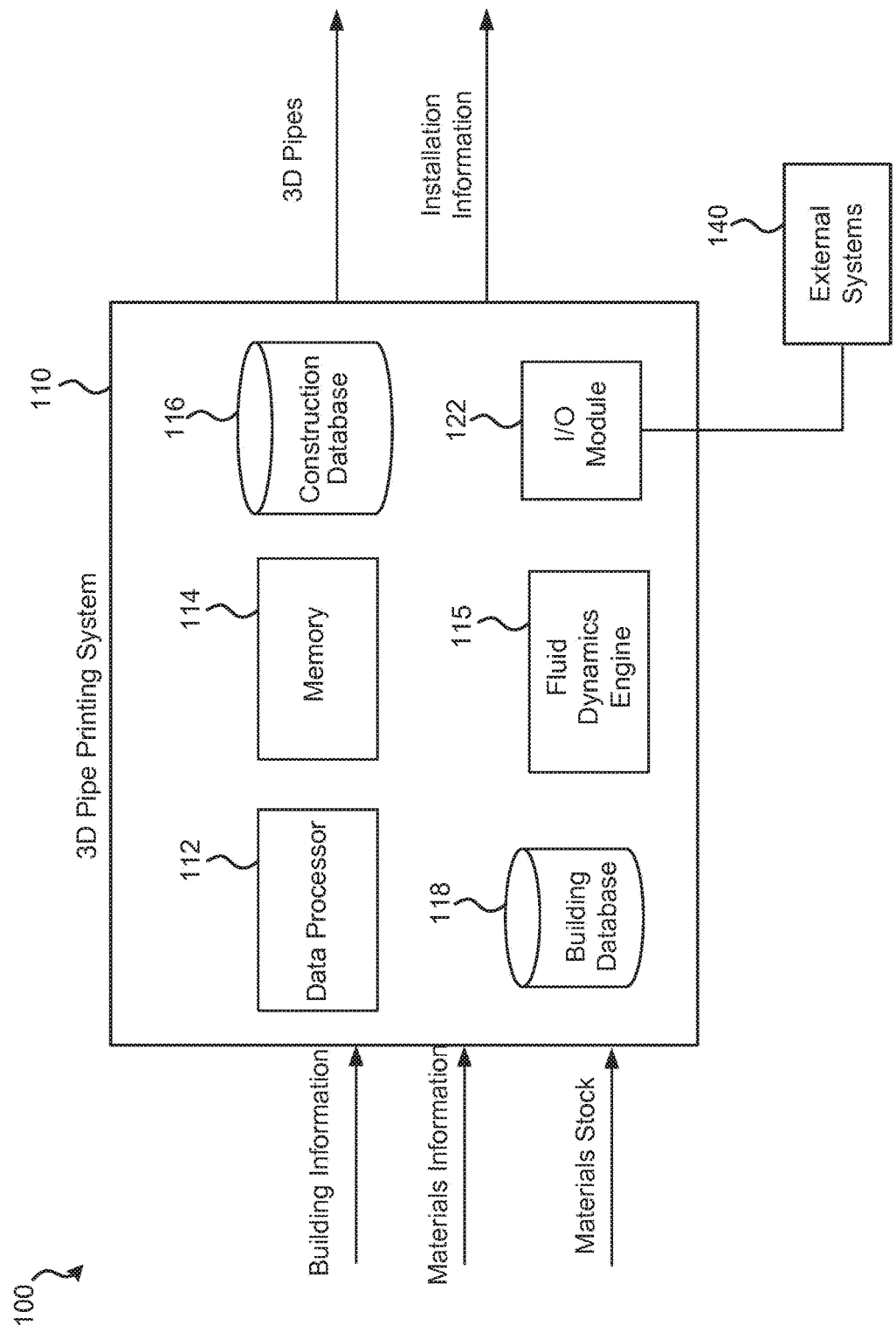
FIG. 1 is a high level block diagram illustrating the relationship between information input and product output according to an embodiment of the present invention.

FIG. 1 shows a high level block diagram for a system 100 for constructing 3D pipes according to an embodiment of the present invention. As illustrated in FIG. 1, the system 100 includes a 3D pipe printing system 110. Building information is received as an input to the 3D pipe printing system. This building information can include information on fluid (e.g., water) sources, fluid outlets, dimensions of walls, floors, ceilings, and the like. This building information can include or can be used in defining and modeling the pipes that will be installed in the building. As an example, architectural drawings of the building can define the layout of pipes that are to be installed in the building. As described more fully below, these layouts can be modified during fluid dynamics modeling to provide benefits available through the present invention.

In the context of both new construction and remodeling, the 3D printer can be located onsite at the construction site or offsite at a fabrication facility. Information on either elements of the new building or elements of the existing building that is being remodeled can be provided as an input as illustrated in FIG. 1 or retrieved from the building database 118. As an example, the design details for an existing plumbing system can be provided as an input. A bulk material processor can be utilized to provide material (i.e., stock material) that is fed into a 3D printer that prints the pipes as they are needed for installation. In other embodiments, a spool or other source of pipe materials can be provided to the onsite fabrication equipment or offsite facility and this material could be utilized to fabricate materials specifically designed for the design specifications of the particular building or structure. Materials information is also provided as an input and will generally be related to the materials stock that is provided to the 3D printer.

The building database 118 may include useful data as well as data that is either outdated or otherwise incorrect for the particular structure or building. As an example, during a remodeling project, the actual plumbing in the walls of the structure may differ from the original plans and this information would not typically be available until portions of the walls, floors, and/or ceilings are removed, revealing the differences between plans and actual implementation. In this case, additional information can be obtained, for example, by measuring the structure, and providing this additional information as an input to update the building database information. In an embodiment, a measurement device inside the structure, such as a laser scanner or other surveying equipment, can take measurements of the physical dimensions of the structure or elements in the structure and this information can be integrated with the 3D pipe printing system to determine the characteristics of the 3D pipe to be printed. Moreover, using this information measured in real time, the design can be modified and the 3D printing process adjusted to accommodate the actual plumbing system present at the site. In addition to plumbing system differences, differences in the structure could be present, such as a barrier to the installation of the plumbing system that is not present in the plans, but is actually present. The design and 3D printing process can thus be modified on-site to account for these differences in design and implementation. Thus, embodiments of the present invention are applicable to real-time adjustment for both external barriers (rock formations and the like) as well as internal barriers present in the structure. One of ordinary skill in the art would recognize many variations, modifications, and alternatives.

As an example, the initial design specifications could call for a pipe of a given length, dimensions, taper angle, and the like (in simplified form, specifications X, Y, and Z). The inspection or measurement of the structure could be used to determine, in real time, that modifications are needed for the pipe, which can then be fabricated to updated length, dimensions, taper angle, and the like (in simplified form, specifications X', Y' and Z). This updated information can then be used to update building database 118 as well as during fabrication of the 3D pipes.

1 The 3D pipe printing system 110 also receives materials information and materials stock, which can include new materials as well as recycled or materials with a predetermined recycled materials content. As an example, at a location where there is existing pipe that has been removed from the building or structure, this existing pipe could be utilized as stock material in the 3D printer and thereby be recycled, to create the new 3D pipe. In one remodeling implementation, pipe that has been removed can be measured to determine the length of the various pipes, for example, by using a scanner that scans the pipes dimensions and then prints 3D pipes to be used as replacements for the pipes that were removed. Depending on the melting point of the various materials recycled and then used for 3D printing of the pipes, the various materials can be processed to provide differing stock materials as a function of processing temperature (e.g., poly vinyl chloride (PVC) at a first temperature, polyethylene (PE) at a second temperature, polypropylene (PPE) at a third temperature, and metals (e.g., aluminum) at a fourth temperature. One of ordinary skill in the art would recognize many variations, modifications, and alternatives.

Construction database 116 is included as part of the 3D pipe printing system 110 and can include information on building codes, materials specifications, and the like. The output of the 3D pipe printing system 110 includes 3D pipes fabricated using the 3D printer 123 of the system and installation information. Fluid dynamics engine 115 works in conjunction with the data processor 112 to compute fluid dynamics algorithms useful in designing the 3D pipes printed by the system. In some embodiments, the functionality of the fluid dynamics engine 115 is provided by the data processor 112. One of ordinary skill in the art would recognize many variations, modifications, and alternatives.

Figure 6:
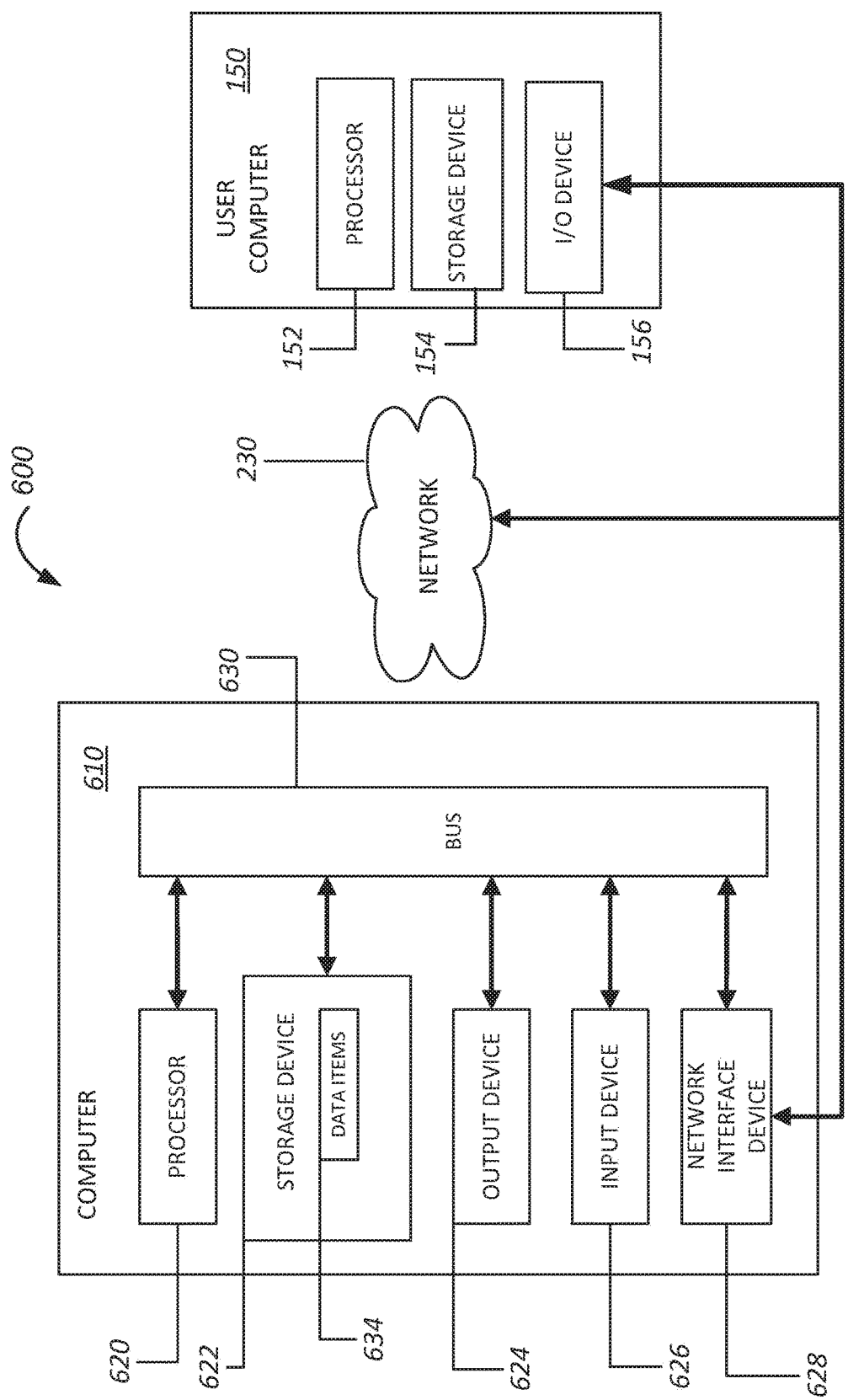
FIG. 6 is a high level schematic diagram illustrating a computer system including instructions to perform any one or more of the methodologies described herein.

Referring to FIG. 1, the 3D pipe printing system 110 includes a number of components: a data processor 112 (also referred to as a processor), the building database 116, a memory 114, and the construction database 118. An input/output module 122 is also provided with suitable functionality to interact with an external system 140, which can include one or more external databases. One or more of the elements of the external systems 140 can be operated by the 3D pipe printing system 110 or by a third party. The description provided in relation to processors and memory in FIG. 6 is also applicable to data processor 112 and memory 114 shown in FIG. 1. These components interact with one another to process the received inputs and to provide the outputs illustrated in FIG. 1.

The 3D pipe printing system 110 provides outputs including the 3D pipes as well as installation information that can be used in installing the 3D pipes. Given the inputs, which can include design values from an architectural diagram, a blueprint, or the measurements discussed above (e.g., using a laser scanner or other building survey tool), the 3D pipes can be fabricated to the desired specifications. Characteristics of the structure, such as already installed barriers, can be utilized to define breaks in the pipes that can be joined after installation.

Although some embodiments are discussed in terms of water pipes, embodiments of the present invention are not limited to these particular implementations and other fluid handling systems, including heating and air conditioning systems, air handling systems in commercial buildings, and the like are included within the scope of the present invention. By providing control over the inner and outer surfaces of the fluid conduits, including the fabrication of complex structures, implementation of countercurrent exchange, and other heat transfer processes can be implemented. One of ordinary skill in the art would recognize many variations, modifications, and alternatives. As an example, electrical conduit can be 3D printed. In a particular example, the electrical conduit can be 3D printed using flexible tubing material, that can be run through the walls of a building in a pliable state and then exposed to a fixing agent in order to cure the material in the desired shape.

In some embodiments, the 3D pipe printing system is stationary (i.e., at a fixed location on site) and prints the 3D pipes based on the specification of the desired system. As an example, for a trenched plumbing system, the specifications could include the trench dimensions and the 3D printing system could then print the pipes to fit in the contours of the trench. In other embodiments, the plumbing (e.g., sprinkler) system could be designed and the 3D pipe printing system could move through environment (e.g., trenches) prepared for the plumbing system, or tunnel through the ground, printing the 3D pipes in the desired location. In hybrid implementations, the 3D printing system can be stationary during a portion of the printing process and move during other portions.

Figure 2:
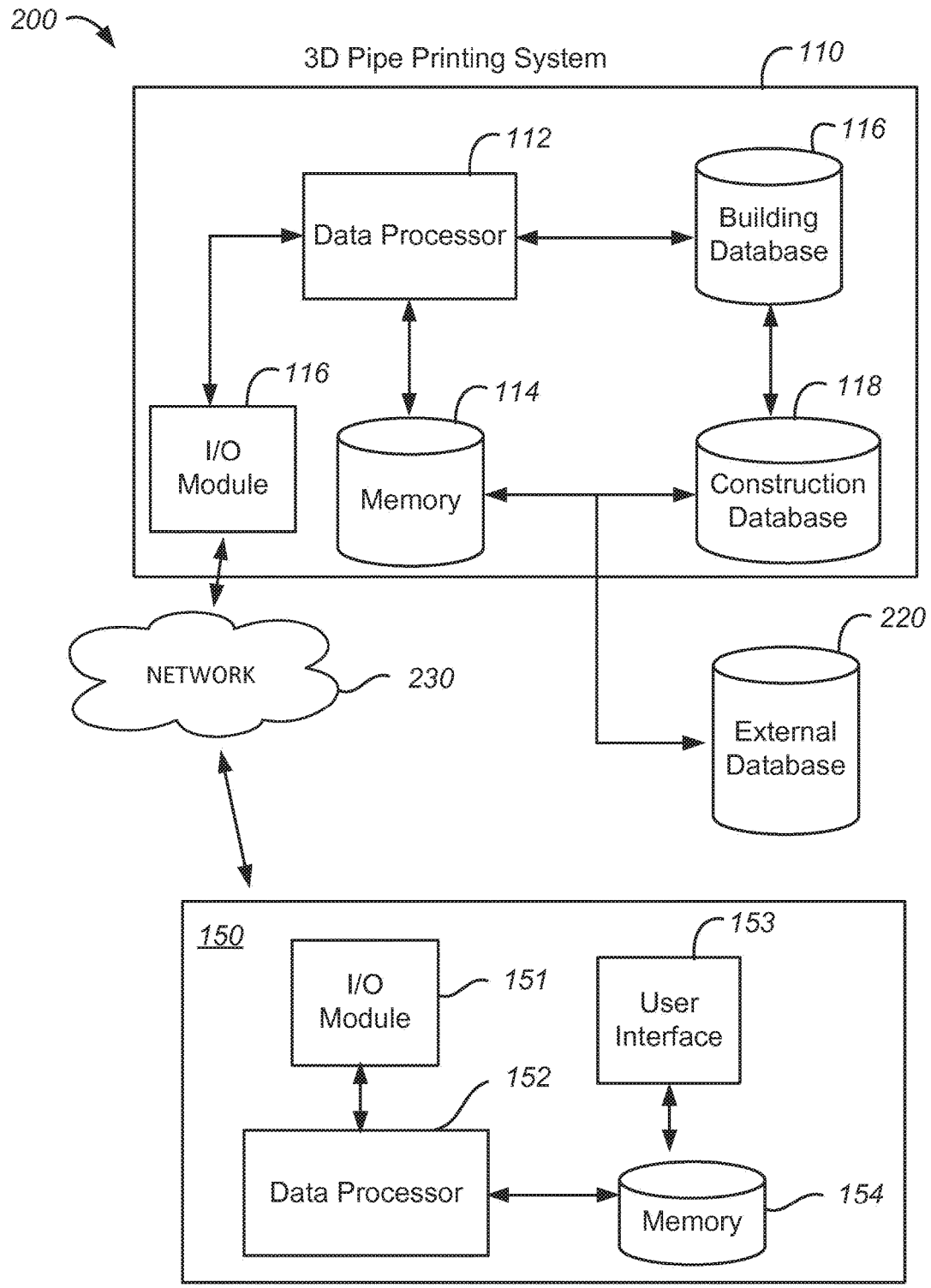
FIG. 2 is a high level schematic diagram illustrating a 3D pipe printing system according to an embodiment of the present invention.

FIG. 2 is a high level schematic diagram illustrating a 3D pipe printing system according to an embodiment of the present invention. Referring to FIG. 2, a network capable device 150 includes a number of components: a data processor 152 (also referred to as a processor), an input/output module 151, a user interface 153, and a memory 154. The network capable device 150 can communicate with the 3D pipe printing system 110 via network 230. Using the 3D printer 123 that is an element of the 3D pipe printing system 110, the various 3D conduits and structures described herein can be printed.

Referring to FIG. 2, the 3D pipe printing system 110 receives information from the network capable device and provides outputs to the network capable device. Examples of interactions between the network capable device 150 and the 3D pipe printing system 110 are discussed in additional detail in relation to FIGS. 4-5 below. External database 220 is provided for use by the 3D pipe printing system 110 as appropriate to the particular application.

Although some embodiments have been discussed in terms of designing the 3D pipes for predetermined flow rates, flow volume, flow pressures, and the like, the present invention is not limited to this design philosophy. In other embodiments, fluid dynamics software is utilized to receive input specifications on flow rate/volume/pressure at various outlets along with position information on the various outlets as well as information on the structure and the system then computes the structure of the 3D pipe suitable for providing the desired flow specifications at the various outlets. In these embodiments, the fluid output is specified and the pipe is then designed to provide these desired flow specifications.

Some embodiments of the present invention provide the capability to manufacture flexible 3D pipe materials. Flexible materials are useful when elements of the construction, such as the foundation, move over time. Another example is a pool liner, which can shift over time. Flexible materials will reduce the likelihood of leaks in these contexts.

Another example of the 3D printing of flexible pipes is the printing of pipes that can change shape upon expansion. The 3D structure of the pipe could enable the pipe to expand in size if the fluid freezes and expands, preventing breakage as a result of freezing. In these implementations, the cross section of the pipe will change as the fluid pressure increases inside the pipe, expanding the cross section. The internal contours of the pipe could also provide this flexible ability to expand, preventing cracking or rupturing.

In addition to flexible materials, the 3D printing process can be utilized to fabricate pipes or other fluid handling structures that have different materials making up the structure. As an example, a pipe with two different materials can be printed, providing an inner lining of one type of material and an outer skin of a different material. Additionally, joints or bends in a pipe can be reinforced during fabrication by printing materials with higher strength characteristics at the joint or bend. Thus, in this example, lengths of pipe could be printed in a first material (e.g., aluminum) and the joints could be printed in a second material (a rubberized material) with the fabrication producing a single structure. In addition to flexible materials, reinforcing materials can be printed, for example, at joints or bends, with the thickness of the pipe being increased at the joint or bend to provide additional mechanical support to withstand shearing or other forces. Additionally, the thickness and other characteristics of the pipe can be varied using the 3D printing process to provide structural reinforcement to support varying fluid pressures as a function of pipe length, which may be different for straight lengths of pipe and bent sections of pipe. These structure reinforcements can take the form of increased pipe thickness, ribbing, bracing, or the like.

In addition to flow characteristics and structural support, the 3D printing process provides a mechanism to customize the pipe in relation to the environment in which the pipe resides. As an example, a device that measures wind speed, sunlight exposure, heat, soil conditions, and other environmental factors as a function of location could be used to collect environmental data. In response to this environmental data, the pipe can be customized with integrated radiator fins for heat dissipation, increased thickness to prevent freezing, or the like. Thus, embodiments of the present invention provides pipes that vary in characteristics as a function of position to provide customized performance.

In some embodiments, concepts discussed herein are combined as part of the 3D printing process. As an example, inputs can be received about fluid pressures and flow rates/volumes at particular outlets. Fluid dynamics software is then used to determine the lengths, internal diameters, and the like to provide the desired fluid specifications. In conjunction with this design process, structural specifications for the pipes can be received as inputs, with modeling software providing designs for the pipe structural features that provide the desired structural rigidity, flexibility, and the like for the system. Thus, in these embodiments, the pipe features as a function of position can be designed and fabricated to meet multiple goals such as pipe inner diameter to achieve fluid specifications and pipe thickness or bracing to achieve structural specifications.

Although some embodiments are described in relation to the inner diameter of the pipe, it will be appreciated that the inner surface features of the pipe will have an impact on the fluid dynamics properties of the pipe. According to embodiments of the present invention, contouring of the inner surfaces of the pipe can be accomplished using the 3D printing process in ways not achievable using conventional piping materials. As an example, contouring of the inner surfaces can be provided to increase or maximize surface area or the like. In applications in which heat transfer between the fluid and the pipe is desired, the internal contours can be designed to increase the surface area and the resulting heat transfer between the fluid and the pipe. Thus, in a building, some pipes that transfer hot water can be designed to provide low thermal conductivity, reducing heat loss, whereas pipes in a heat exchanger can be designed with high thermal conductivity to facilitate heat transfer.

Another example of the design flexibility provided by the 3D printing process is that a capillary system can be used in which for specific portions of the building in which pressure and flow are to be reduced, a single line could split into multiple lines having reduced pressure and flow. These multiple lines can then be recombined at a desired location into a single line to reestablish the original pressure and flow.

Figure 3:
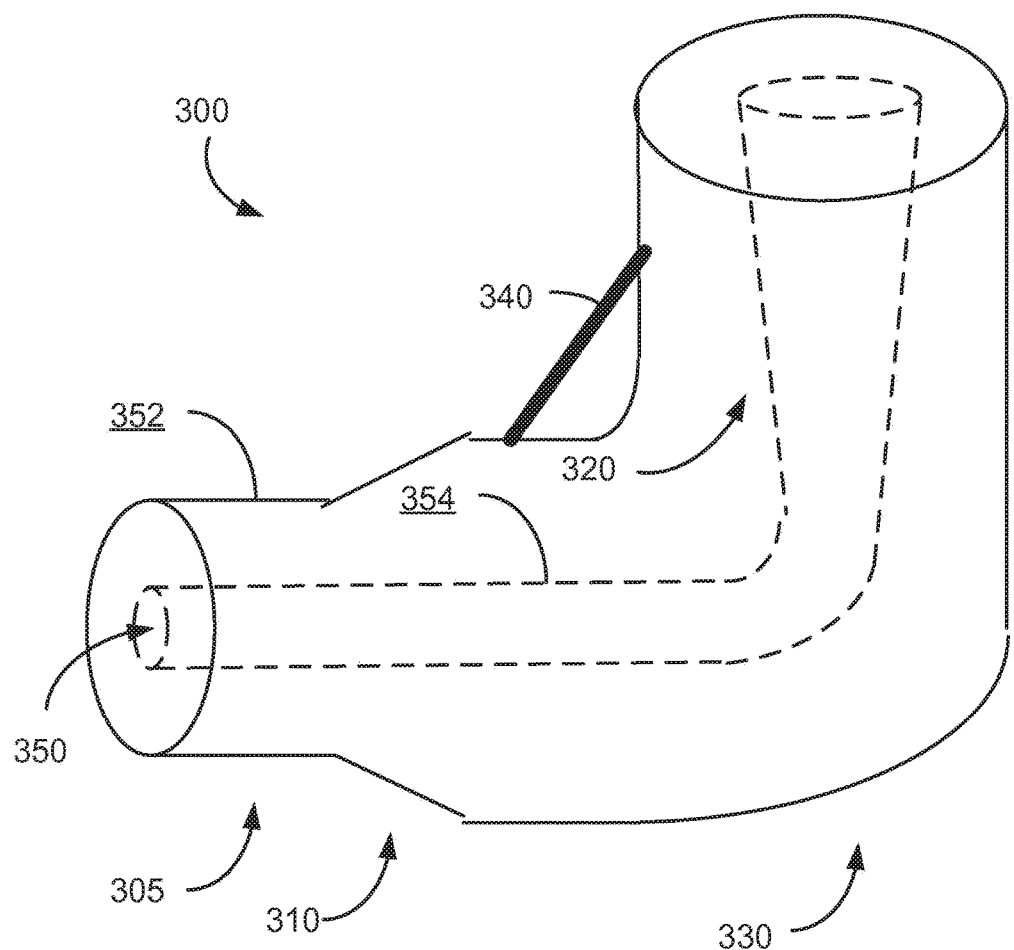
FIG. 3 is a high level schematic diagram illustrating a 3D pipe printed according to an embodiment of the present invention.

FIG. 3 is a high level schematic diagram illustrating a 3D pipe printed according to an embodiment of the present invention. The 3D pipe 300 illustrates a region of constant cross-section 305, varying cross-section 310, a differing internal thickness 320, a reinforced joint 330, and mechanical supports 340.

Referring to FIG. 3, the 3D pipe 300, which can also be referred to as a conduit, is fabricated based on schematic information for the conduit. The conduit is operable to support a variety of fluids, including liquids, liquids supporting floating solids, gases such as air, and the like. As illustrated in FIG. 3, the conduit is characterized by a three-dimensional configuration that includes both variation in outer housing surfaces and inner housing surfaces. Utilizing three-dimensional printing processes, the conduit having the desired three-dimensional configuration can be printed.

The schematic information for the conduit can include internal structure information, such as the variation in the inner diameter in region 320. Additionally, the schematic information for the conduit can include external structure information, such as the mechanical support 340, the reinforced joint 330, or the like. The schematic information can include 3D geometry information and material information for the system, including the external structure, that is to be manufactured. One of ordinary skill in the art would recognize many variations, modifications, and alternatives. The portions of the structure that are more prone to damage, corrosion, structural weakness over time, or the like, the strength and/or corrosion resistance of the materials in the structure can be printed with differing materials as a function of radial dimension (i.e., from the inside to the outside of the structure). As an example, a corrosion resistant material could be utilized in contact with a corrosive fluid and a strong material could be utilized to provide mechanical support at appropriate locations.

Without limiting embodiments of the present invention, conduits or pipes formed using three-dimensional printing processes can have a variety of shapes and be utilized for a variety of applications. As an example, varying cross-sectional profiles can be used to control at least one of a fluid pressure or a fluid flow at various locations in the three-dimensional conduit system. Referring once again to FIG. 3, at least one layer of material is used to form a housing, also referred to as the conduit material. In some embodiments, multiple layers of differing or the same materials are utilized to form a composite structure, which can be referred to as a composite layer. As an example, materials with differing thermal expansion coefficients can be utilized to provide a buffer material between layers that can accommodate thermal variations in the environment. The housing includes an internal passage 350, a first housing surface 352 (i.e., the outer surface), and a second housing surface 354 (i.e., the inner surface). The first housing surface 352 is representative of first configuration information, which defines the materials, the shape, and other characteristics of the outer surface of the conduit. The first configuration information can be specified using schematics for the three-dimensional conduit. As illustrated in FIG. 3, the first housing surface forms an external structural element defining the conduit. Structural support can be provided by attaching supports to the conduit or attaching portions of the conduit to itself as shown by mechanical support 340.

The second housing surface 354 generally opposes the first housing surface 352 and is representative of second configuration information defining the materials, the shape, and other characteristics of the inner surface of the conduit. The second configuration information can be specified using schematics for the three-dimensional conduit. Although the second housing surface 354 is illustrated as smooth in FIG. 3, this is not required by the present invention and other configurations, including corrugated, roughened, or the like can be provided. The second housing surface 354 forms an internal structural element and affects at least one of a fluid pressure or a fluid flow of a fluid that is flowing through the conduit. For example, as the cross-section of the inner surface increases in region 320, fluid pressure and flow are affected.

The printing of the 3D pipe 300 can be performed using a continuous printing process to fabricate a single integrated structure in contrast with conventional techniques of manufacturing separate pieces that are joined together to form the illustrated structure. Thus, embodiments provide methods and systems for integrated fabrication of complex shapes, including the varying internal and external diameters, bends, structural supports, that are not available using conventional techniques.

Figure 4:
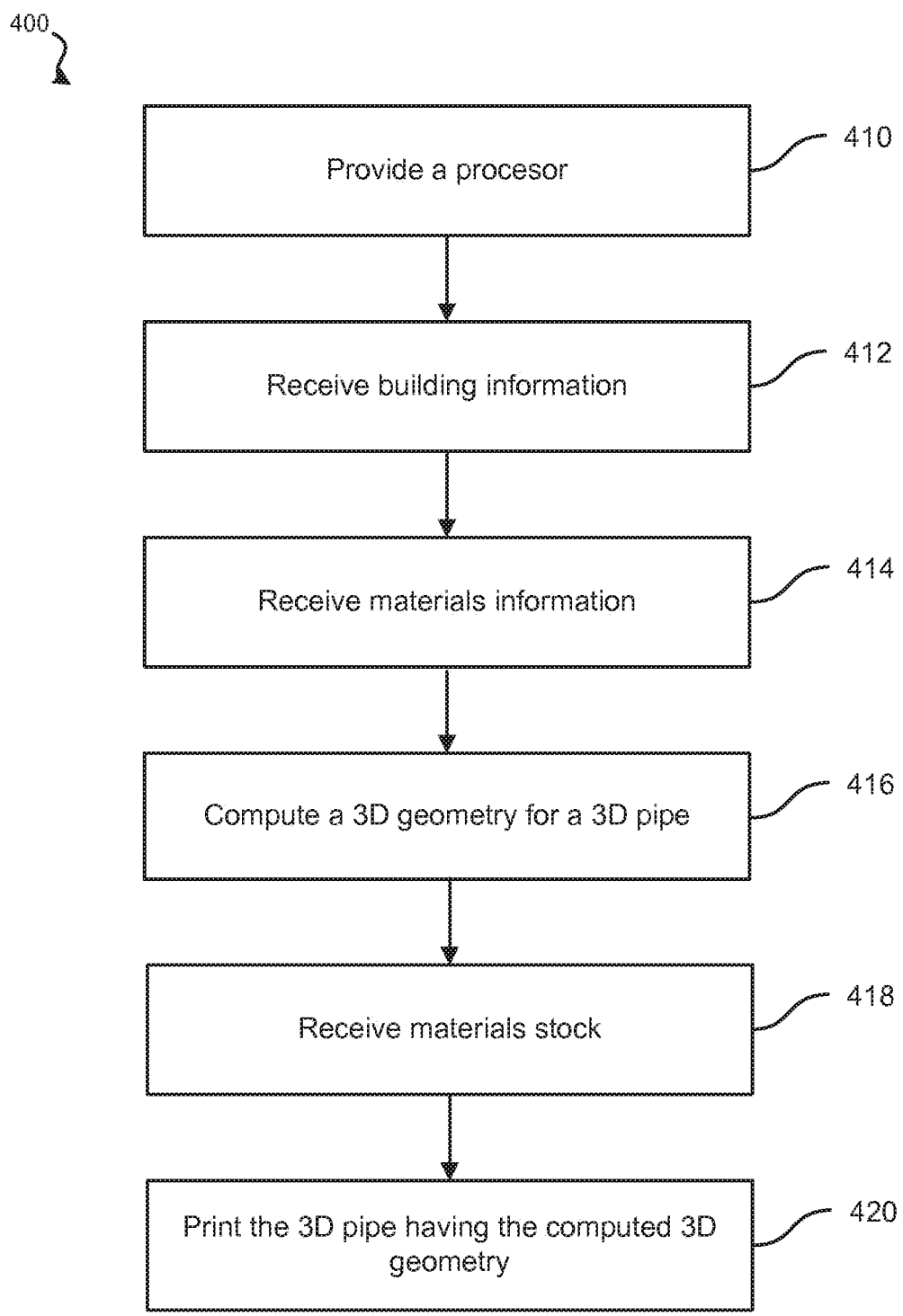
FIG. 4 is a high level flowchart illustrating a method of fabricating a 3D pipe according to an embodiment of the present invention.

FIG. 4 is a high level flowchart illustrating a method of fabricating a 3D pipe according to an embodiment of the present invention. The method 400 includes providing a processor (410) and receiving building information (412). The building information can include architectural plans for a structure, such as new construction or a remodeling project.

The method also includes receiving materials information (414) and computing, using the processor, a 3D geometry for the 3D pipe (416). In embodiments, fluid dynamics codes are used to design a system that provides a predetermined pressure and flow rate at a predetermined location (e.g., a fluid outlet such as a faucet or shower). The method further includes receiving materials stock, which may include recycled materials (418) and printing the 3D pipe having the computed 3D geometry (420).

It should be appreciated that the specific steps illustrated in FIG. 4 provide a particular method of fabricating a 3D pipe according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
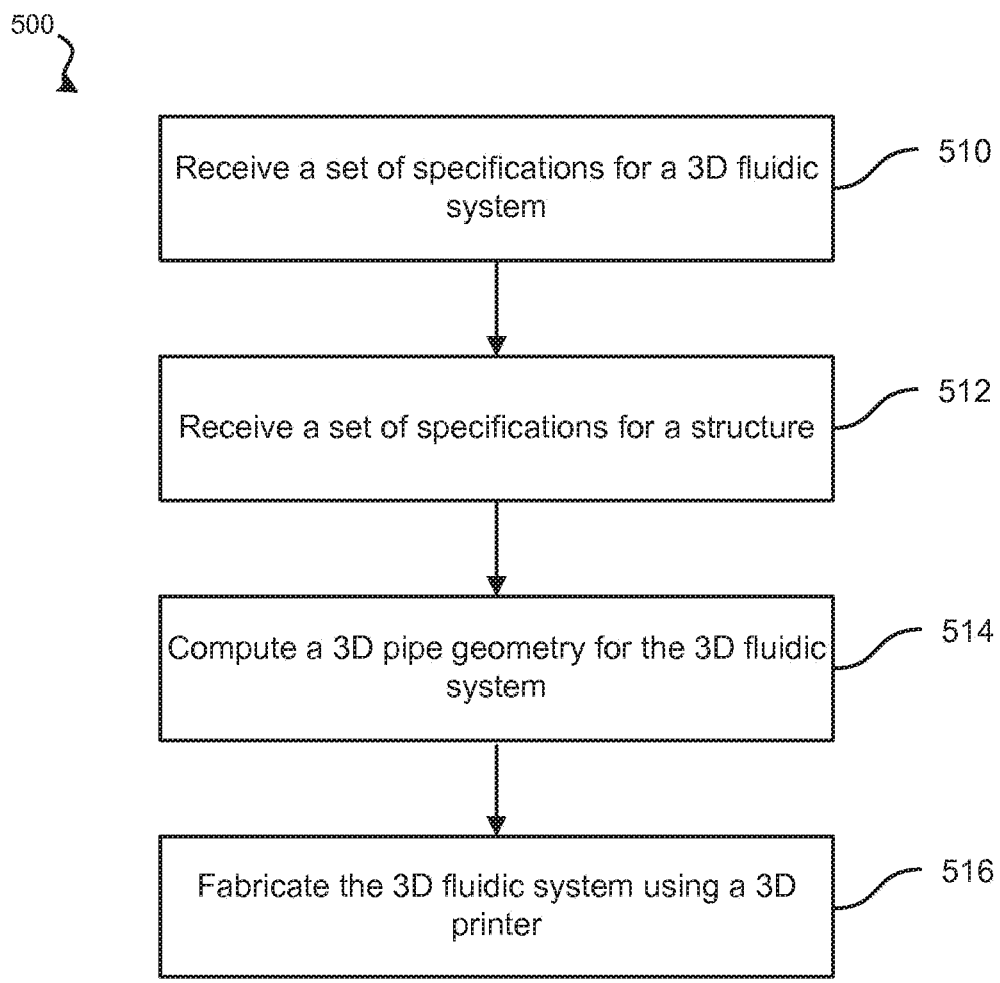
FIG. 5 is a high level flowchart illustrating a method of printing a 3D fluidic system according to an embodiment of the present invention.

FIG. 5 is a high level flowchart illustrating a method of printing a 3D fluidic system according to an embodiment of the present invention. The method 500 includes receiving a set of specifications for the 3D fluidic system (510). The set of specifications includes fluid input pressure at a source and a plurality of fluid outlet pressures and flow rates, each of the plurality of fluid outlet pressures and flow rates being associated with a one of a plurality of fluid outlets.

The method also includes receiving a set of specifications for a structure including the plurality of fluid outlet (512) (e.g., architectural plans for the structure) and computing a 3D pipe geometry for the 3D fluidic system (514). Each of the plurality of fluid outlet pressures and flow rates are provided at each of the plurality of fluid outlets. Computing the 3D pipe geometry can include providing a mechanical characteristic for the 3D fluidic system, such as mechanical strength and load bearing capacity as a function of position. The method further includes fabricating the 3D fluidic system using a 3D printing process (516). The 3D fluidic system can be characterized by varying pipe thickness as a function of length, varying pipe inner diameter as a function of length, or the like. Additionally, the 3D printing process enables the printing of structural supports integrated with the 3D fluidic system.

It should be appreciated that the specific steps illustrated in FIG. 5 provide a particular method of printing a 3D fluidic system according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 6 is high level schematic diagram illustrating a computer system including instructions to perform any one or more of the methodologies described herein. A system 600 includes a computer 610 connected to a network 230. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 230 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 230.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 230 through any suitable communications protocol. The network interface device 628 sends and receives data items from the network 230.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 230 may be any suitable network and may support any appropriate protocol suitable for communication to the computer 610. In an embodiment, the network 230 may support wireless communications. In another embodiment, the network 230 may support hard-wired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be any appropriate cellular data network or cell-based radio network technology. In another embodiment, the network 230 may be an IEEE 802.11 wireless network. In still another embodiment, the network 230 may be any suitable network or combination of networks. Although one network 230 is shown, in other embodiments any number of networks (of the same or different types) may be present.

A user computer 250 can interact with computer 610 through network 230. The user computer 250 includes a processor 252, a storage device 254, and an input/output device 256. The description related to processor 620 and storage device 622 is applicable to processor 252 and storage device 254. As an example, the user computer 250 can be a personal computer, laptop computer, or the like, operated by a member of a membership organization (e.g., the present assignee). Using the user computer 250, the member can then interact with computer 610 operated by the present assignee through network 230 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Embodiments of the present invention can be implemented using a non-transitory computer-readable storage medium that includes a plurality of computer-readable instructions tangibly embodied on the computer-readable storage medium, which, when executed by a data processor, provide the methods described herein.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method for fabricating a three-dimensional (3D) system to be installed in a building structure, the 3D system including a plurality of conduit, the method comprising:

measuring physical dimensions of the building structure at a predetermined installation location in the building structure where a conduit of the plurality of conduits is to be installed, the physical dimensions measured using a laser scanner that is situated inside the building structure;

receiving specifications of the 3D system that includes the plurality of conduits, the specifications including at least a fluid pressure provided by the conduit of the plurality of conduits at the predetermined installation location;

determining 3D configurations of the 3D system based at least on (i) the fluid pressure, and (ii) the physical dimensions of the building structure measured using the laser scanner; and fabricating the 3D system based on the determined 3D configurations using a 3D printing process.

2. The method of claim 1, wherein the fluid pressure will be provided by a fluid outlet of the conduit.

3. The method of claim 1, wherein the specifications further include a flow rate that will be provided at a fluid outlet of the conduit.

4. The method of claim 1, wherein the specifications further include a fluid input pressure at a source.

5. The method of claim 1, wherein determining the 3D configurations for the 3D system includes determining at least one of a length, an internal diameter, or a thickness of the conduit that provides the fluid pressure.

6. The method of claim 1, wherein determining the 3D configurations includes determining mechanical characteristics of the 3D system.

7. The method of claim 6, wherein determining the mechanical characteristics includes determining mechanical strength and load bearing capacity of the conduit based on the fluid pressure and the predetermined position.

8. The method of claim 1, wherein the predetermined installation location includes one of (i) inside a wall, (ii) inside a ceiling, or (ii) under a floor.

* * * * *